Dec. 21, 1954   C. R. DEMING   2,697,811
CURRENT LIMITING VOLTAGE REGULATOR
Filed Feb. 3, 1954

INVENTOR.
CHARLES R. DEMING
BY
Nicholas T Volk
HIS ATTORNEY.

United States Patent Office 2,697,811
Patented Dec. 21, 1954

2,697,811

CURRENT LIMITING VOLTAGE REGULATOR

Charles Reed Deming, Venice, Calif., assignor to Hughes Aircraft Company, Culver City, Calif., a corporation of Delaware Application February 3, 1954, Serial No. 407,858

4 Claims. (Cl. 323—22)

This invention relates to current limiting circuits and more particularly to a circuit for limiting the load current of a voltage-regulated direct-current supply.

In order to protect laboratory equipment, it is often desirable to provide a current limiting circuit with a direct-current power supply whereby substantial current limiting takes place only above a certain critical load current. It is preferred that the output current from this power supply be absolutely limited to a value which is only slightly larger than this critical load current in order to protect apparatus associated with the supply.

In general, there are two types of current limiting circuits. One of these is designated as the ballast type and the other as the degenerative type. The ballast type is employed to limit the current of a supply simply by means of series ballast resistor whereas the degenerative type constitutes a series electron tube wherein the magnitude of its grid bias is made to vary as a function of the load current. In the latter type, the increase of load current for corresponding decreases in the load resistance or increases in supply voltage is very small; however, an arrangement of this type proves very unsatisfactory for providing a regulated output voltage for load currents in the operating range of the power supply.

Alternatively, the circuit of the present invention incorporates a current limiting circuit of the degenerative type that commences to function only when a certain critical load current is exceeded. Below this critical load current, the circuit provides a regulated output for variations in either the supply voltage or the load impedance.

It is, therefore, an object of the invention to provide a direct-current power supply wherein the current cannot exceed a certain predetermined value.

It is another object of the invention to provide a voltage-regulated power supply incorporating an improved circuit for limiting the load current only after it exceeds a certain critical value.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings, which constitute a part of this specification, are for the purpose of illustration and description only, and are not intended as a definition of the limits of the invention.

Figure 1:
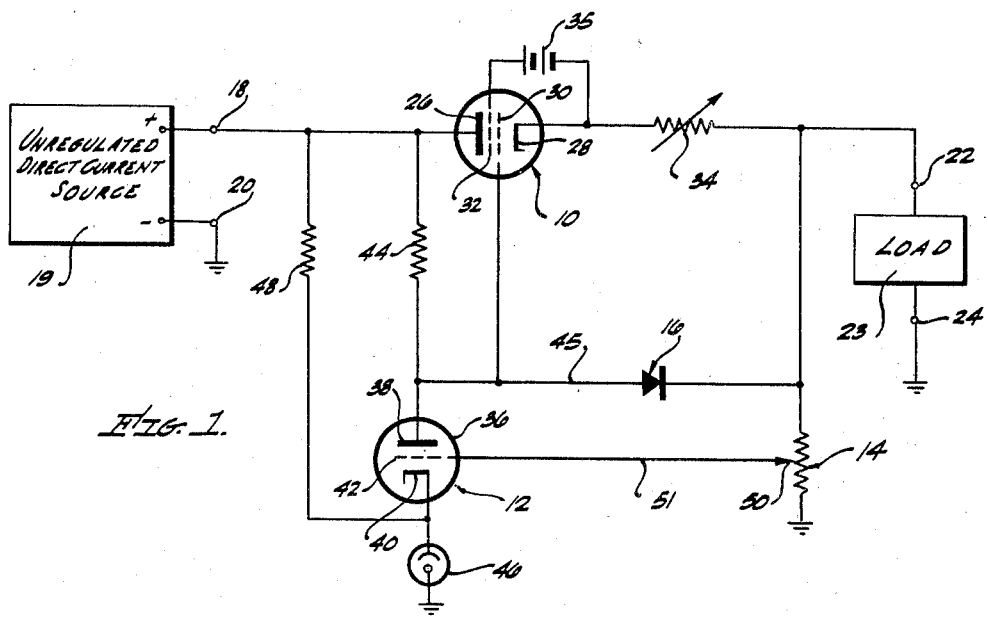
Fig. 1 is a schematic diagram of an embodiment of the present invention.

Referring to Fig. 1, there is illustrated an embodiment of the circuit of the present invention comprising a series regulator tube 10, a direct-current amplifier 12, a voltage divider 14, and a feedback diode 16. Terminals 18, 20 and 22, 24 provide input terminals and output terminals, respectively. During the operation of the circuit of the present invention, an unregulated direct-current source 19 is connected across input terminals 18 and 20 and a direct-current load 23 is connected across the output 22 and 24.

Proceeding with a more detailed description of the circuit, series regulator tube 10 includes a plate 26, a cathode 28, a control grid 30, and a screen grid 32. The gain provided by series regulator tube 10 determines the abruptness with which the load current can be decreased to zero after it has exceeded the critical value. Since it is desirable to make this decrease as abrupt as possible, it is preferable to employ either a tetrode or a pentode for regulator tube 10. Input terminals 18 and 20 are connected directly to plate 26 of tube 10 and to ground, respectively, and the output terminals 22 and 24 are connected through a variable resistor 34 to cathode 28 of tube 10 and to ground, respectively. Screen grid 32 is maintained at a fixed potential with respect to the cathode 28 of the regulator tube 10 so that its tetrode characteristics will be retained. The maintenance of this fixed potential on screen grid 32 relative to the potential of cathode 28 is accomplished by means of a battery 35 connected therebetween.

The voltage drop across series regulator tube 10 is determined by the bias impressed on grid 30. In the current-limiting phase of operation, this bias is produced by diode 16 which is connected from grid 30 to output terminal 22 and is poled to be conductive in a direction towards the output terminals. In the voltage-regulated phase of operation, however, the bias impressed on grid 30 is provided by the direct-current amplifier 12. During this phase of operation this bias potential is negative with respect ot the potential of output terminal 22 so that the grid 30 of tube 10 is isolated from any potential that may appear on terminal 22 by diode 16.

Direct-current amplifier 12 comprises a tube 36 including at least a plate 38, a cathode 40, and a control grid 42. Plate 38 is connected through a load resistor 44 to a source of positive potential which may be, for example, input terminal 18. Cathode 40 is maintained at a fixed positive potential with respect to ground by means of a glow tube 46 connected from the cathode 40 to ground. A bypass resistor 48 may also be connected from input terminal 18 to the junction between cathode 40 and glow tube 46 to allow additional current to flow through the glow tube 46 so that it remains ionized regardless of the current flowing through tube 36. Variations in the output voltage appearing across output terminals 22 and 24 are impressed on grid 42 by means of divider 14, tap 50, and conductor 51. Since cathode 40 is maintained at a fixed positive potential with respect to ground, tap 50 may be adjusted so that the potential of grid 42 is maintained at a potential that is negative with respect to that of cathode 40 to effect linear operation of the tube.

Figure 2:
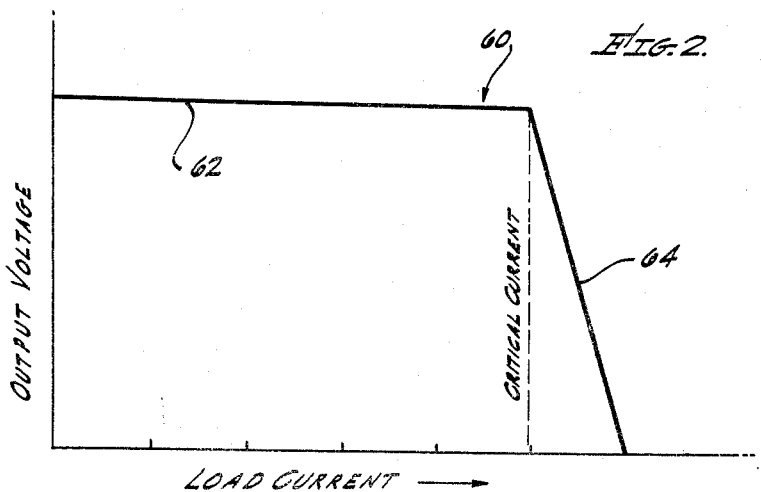
Fig. 2 is a typical output voltage current characteristic of the embodiment illustrated in Fig. 1.

The operation of the voltage-regulated current-limited circuit of the present invention is in two phases, namely, the regulated output voltage phase, and the current-limiting phase. These two phases are illustrated more clearly by Fig. 2 wherein line 60 represents the output voltage developed across a load for an increasing load current. More particularly, portion 62 of line 60 represents the phase where a regulated output voltage is produced across the load. This phase extends from zero current to the critical current which occurs when there is zero volts across diode 16 with no current flowing therethrough. The second current-limiting phase of operation is represented by portion 64, which extends from the critical current to the point where zero output voltage exists across the load, the current at zero output voltage being only slightly greater than the critical current where the current-limiting commenced.

Thus, there are two phases of operation in the circuit of the present invention. In the first phase of operation, a substantially constant output voltage is maintained across load 23 as the load current increases from zero to the critical value. The operation of the circuit during this phase is that of a conventional voltage-regulated power supply. Basically, an incremental change in the output voltage appearing across the output terminals 22, 24 is impressed on grid 42 through voltage divider 14. This incremental change in voltage, impressed on grid 42, produces a corresponding change in the current flowing through load resistor 44 which alters the bias impressed on grid 30 of regulator tube 10 in a manner to minimize the change in the output voltage appearing at terminals 22, 24. During this phase of operation, the diode 16 remains nonconductive in that the potential of the grid 30 of regulator tube 10 remains negative with respect to the potential of output terminal 22 because of the voltage drop produced across regulator tube 10 and resistor 34, which is smaller than that across resistor 44.

During the voltage regulating phase of operation, the cathode 28 of regulator tube 10 is maintained increasingly positive with respect to the output terminal 22 by virtue of the voltage drop produced by the load current in flowing through variable resistor 34. In order to effect voltage regulation at the output terminals 22, 24, it is apparent that grid 30 must go increasingly positive for increasing load currents in order to decrease the voltage drop across regulator tube 10, thereby maintaining a substantially constant voltage output. Thus, as the potential of grid 30 increases in a positive direction, a potential will be reached which is equal to that of output terminal 22.

The above obtains as follows: in response to any decrease in load resistance, there will be corresponding increase in load current because of the corresponding decrease in the plate resistance of tube 10, the latter taking place because grid 42 now is made less positive because of decrease in current flowing through potentiometer 14. As triode 12 is rendered less conductive, grid 30 is made more positive with the concomitant decrease in the plate resistance of tetrode 10 and constant voltage across load 23. The above is accompanied with a corresponding rise in the positive direction of grid 30 and conductor 45, and a point finally is reached at which the potential across diode 16 is zero. The current flowing through the load at this instant is designated as the "critical current," which is the current at which current-limiting commences. This critical current may be adjusted to a desired value by means of variable resistor 34. In this respect, lower values of resistance for resistor 34 give increasingly higher critical currents.

As stated above, the current-limiting phase of operation commences when the potential of grid 30 of tube 10 is just equal to that of terminal 22 at which time the critical load current flows. An increase in current over the critical current will produce an increased voltage drop across resistor 34 to lower the voltage appearing at terminal 22, thus making diode 16 conductive at this instant. This condition results in additional current flowing through resistor 44, diode 16 and load 23. Inasmuch as the resistor 44 has a much higher resistance than the forward resistance of diode 16, the additional current flowing through resistor 44 produces an increased voltage drop which will maintain the potential of grid 30 substantially equal to the potential of terminal 22. Thus the direct-current amplifier 12 is effectively disabled during this phase of operation.

Further increases in the load current have the effect of increasing the voltage drop across resistor 34 which constitutes an increase in the bias on grid 30 with respect to cathode 28 since grid 30 and terminal 22 are maintained at the same potential. This increase in bias produces a corresponding increase in the voltage drop across tube 10 which further reduces the output voltage. The abruptness with which the output voltage decreases to zero for increases in the load current in excess of the critical current is determined by the gain parameter of tube 10. Thus it is seen that, for an abrupt decrease of the output voltage to zero, it is preferable to employ either a tetrode or pentode for the series regulator tube 10.

It is apparent that the circuit parameters of the voltage-regulated current-limited power supply of the present invention may vary according to the requirements for any particular application. The following circuit parameters are included, by way of example only, as suitable for a power supply for producing a voltage-regulated output of 1000 volts from 0 to 5 milliamperes.

Unregulated direct-current source_____ 1300 volts.
Regulator tube 10_____ 6BF5.
Variable resistor 34_____ 2000 ohms.
Resistor 44_____ 1.0 megohm.
Tube 36_____ 6AG5.
Tube 46_____ VR150.
Voltage divider 14_____ 12.0 megohms.

What is claimed as new is:

1. In a power supply for regulating a direct-current source of potential to produce a substantially constant voltage across a load circuit, said supply having amplifier means responsive to changes in the magnitude of said substantially constant voltage for developing a control signal, variable impedance means responsive to said control signal and connected between said direct-current source and said load circuit for minimizing the changes in said voltage across said load circuit, and a current limiting circuit for limiting the current flowing through said load circuit after it has exceeded a certain predetermined value, said current limiting circuit comprising: a resistor connected between said variable impedance means and said load circuit, and a unidirectionally conducting device connected between the output of said amplifier means and said load circuit, said unidirectionally conducting device being poled to be conductive when said control signal becomes more positive than said substantially constant voltage.

2. A circuit for limiting the current flow from a direct-current source of potential through a load impedance, said circuit comprising first and second input and output terminals, said input terminals being connected across said direct-current source of potential, said output terminals being connected across said load impedance, and said second input and output terminals being additionally connected to a point of substantially fixed potential; a resistor; an electron discharge device including at least a plate, a control grid, and a cathode, said plate being connected to said first input terminal and said cathode being connected through said resistor to said first output terminal; means for producing a control voltage and for impressing said control voltage on said control grid to control the plate resistance of said electron discharge device; and a unidirectionally conducting device connected between said control grid and said first output terminal for maintaining the potential of said control grid substantially equal to the potential of said first output terminal when said control voltage becomes more positive than the potential of said first output terminal.

3. The circuit as defined in claim 2 wherein said electron discharge device includes a screen grid, and additional means for maintaining said screen grid at a predetermined positive potential relative to the potential of said cathode to increase the gain parameter of said electron discharge device.

4. A circuit for limiting the current from an unregulated direct-current source of potential through a load impedance, said circuit comprising first and second input and first and second output terminals, said input terminals being connected across said direct-current source of potential, said output terminals being connected across said load impedance, and said second input and output terminals being additionally connected to a point of substantially fixed potential; a variable resistor; an electron discharge device including at least a plate, a control grid, and a cathode, said plate being connected to said first input terminal and said cathode being connected through said variable resistor to said first output terminal; means responsive to changes in potential across said output terminals for producing a control voltage and for impressing said control voltage on said control grid to minimize said changes in potential; and a unidirectionally conducting device connected between said control grid and said first output terminal and poled to be conductive in a direction towards said first output terminal to limit the current through said load impedance after it has exceeded a certain predetermined value.

No references cited.